(12) United States Patent
Ohyama

(10) Patent No.: US 10,127,208 B2
(45) Date of Patent: Nov. 13, 2018

(54) DOCUMENT CONVERSION DEVICE, DOCUMENT CONVERSION METHOD, AND RECORDING MEDIUM

(71) Applicant: FUJITSU LIMITED, Kawasaki-shi, Kanagawa (JP)

(72) Inventor: Shogo Ohyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 691 days.

(21) Appl. No.: 14/590,275

(22) Filed: Jan. 6, 2015

(65) Prior Publication Data
US 2015/0120769 A1 Apr. 30, 2015

Related U.S. Application Data

(63) Continuation of application No. PCT/JP2012/067870, filed on Jul. 12, 2012.

(51) Int. Cl.
*G06F 17/22* (2006.01)
*G06F 17/30* (2006.01)
*G06Q 10/10* (2012.01)

(52) U.S. Cl.
CPC ...... *G06F 17/2264* (2013.01); *G06F 17/2241* (2013.01); *G06F 17/2247* (2013.01);
(Continued)

(58) Field of Classification Search
CPC ........... G06F 17/2247; G06F 17/30914; G06F 17/227
See application file for complete search history.

(56) References Cited

U.S. PATENT DOCUMENTS 6,950,984 B2 * 9/2005 Hori ............... G06F 17/211
715/229
7,100,112 B1 * 8/2006 Winser ............ G06F 17/2247
715/210
(Continued)

FOREIGN PATENT DOCUMENTS

JP 10-011441 1/1998
JP 10-021249 1/1998
(Continued)

OTHER PUBLICATIONS

Extended European Search Report dated Nov. 19, 2015 in corresponding European Patent Application No. 12880906.8.
(Continued)

*Primary Examiner* — Scott Baderman
*Assistant Examiner* — Mario M Velez-Lopez
(74) *Attorney, Agent, or Firm* — Staas & Halsey LLP

(57) ABSTRACT

A non-transitory computer-readable recording medium has stored therein a document conversion program converting a first document into a second document that causes a computer to execute a process. The process includes: detecting a first document item in the first document that corresponds to a second document item in the second document that has a child document item in the second document based on a hierarchical document that includes a hierarchical relationship information among document items in the second document, and dividing a content of the first document item; relating the divided content of the first document item to the child document item; and converting the first document into the second document by using the related divided content and the child document item.

6 Claims, 14 Drawing Sheets

(52) U.S. Cl.
CPC .. *G06F 17/30011* (2013.01); *G06F 17/30914* (2013.01); *G06Q 10/10* (2013.01)

(56) References Cited

U.S. PATENT DOCUMENTS

| | | | | |
|---|---|---|---|---|
| 7,275,208 | B2* | 9/2007 | Uramoto | G06F 17/2247 707/999.1 |
| 7,296,028 | B1* | 11/2007 | Ivanova | G06F 8/74 |
| 7,539,940 | B2* | 5/2009 | Yalovsky | G06F 17/2241 715/204 |
| 7,676,741 | B2* | 3/2010 | McGatha | G06F 17/2247 715/205 |
| 8,032,822 | B1* | 10/2011 | Artamonov | G06Q 40/123 704/9 |
| 2001/0014899 | A1* | 8/2001 | Fujikawa | G06F 17/2247 715/234 |
| 2001/0054046 | A1* | 12/2001 | Mikhailov | G06F 17/243 715/221 |
| 2003/0198850 | A1 | 10/2003 | Suzuki et al. | |
| 2004/0205562 | A1* | 10/2004 | Rozek | G06F 17/2247 715/239 |

FOREIGN PATENT DOCUMENTS

| | | |
|---|---|---|
| JP | 2001-290801 | 10/2001 |
| JP | 2003-316765 | 11/2003 |
| JP | 2006-011549 | 1/2006 |
| JP | 2007-299064 | 11/2007 |

OTHER PUBLICATIONS

Hardy et al., "Creating Structured PDF Files Using XML Templates", DocEng '04, Oct. 28-30, 2004, Milwaukee, Wisconsin, USA, pp. 99-108.

Harit et al., "A Model Guided Document Image Analysis Scheme", IEEE, 2001, pp. 1137-1141.

Bernard H., "Plain Text Format—reverseXSL Sample", Jul. 2009, 1 p.

Vinjamur et al., "Automatic Extraction and Generation of XML Documents from Financial Reports", Association for Information Systems (AIS) Electronic Library, Americas Conference on Information Systems 2005 Proceedings, 2005, pp. 3398-3405 with one cover page.

"The reverseXSL Transformer Message DEFinition Files", Art of e.biz, Apr. 2012, pp. 1-64.

"Text to XML: converting loosely-structured text data", Jul. 1, 2009, Retrieved from the Internet: <http://www.reversexsl.com/j/index2.php?option=com_content&task=view&id=43&pop=1&page=0&Itemid=65>, pp. 1-16.

Cagle, "Convert a Text File to XML", Oct. 1, 1999, Retrieved from the Internet: <http://www.devx.com/getHelpOn/10MinuteSolution/20356>, pp. 1-9.

Walmsley, "Add structure and semantics to content with XSLT 2.0 Transform unstructured narrative content to structured, feature-rich XML", IBM developerWorks, Jul. 7, 2011, pp. 1-17.

Ramanathan et al., "Challenges in Generating Bookmarks from TOC Entries in e-Books", DocEng '12, Sep. 4-7, 2012, Paris, France, pp. 37-40.

Japanese Office Action dated Dec. 1, 2015 in corresponding Japanese Patent Application No. 2014-524560.

Australian Office Action dated Jan. 6, 2016 in corresponding Australian Patent Application No. 2012385075.

Australian Office Action dated Aug. 19, 2015 in corresponding Australian Patent Application No. 2012385075.

European Office Action dated Jan. 27, 2017 in corresponding European Patent Application No. 12 880 906.8.

International Search Report dated Aug. 21, 2012 in corresponding international application PCT/JP2012/067870.

Australian Office Action dated May 4, 2016 in corresponding Australian Patent Application No. 2012385075.

Gundavaram, "CGI Programming on the World Wide Web", Mar. 1996, Retrieved from the Internet: http://www.oreilly.com/openbook/cgi/appb_01.html, pp. 1-3.

Ducharme, "Regular Expression Matching in XSLT 2", Jun. 4, 2003, Retrieved from the Internet: http://www.xml.com/pub/a/2003/06/04/tr.html, pp. 1-3.

European Office Action dated Sep. 19, 2018 in corresponding European Patent Application No. 12880906.8 in English.

\* cited by examiner

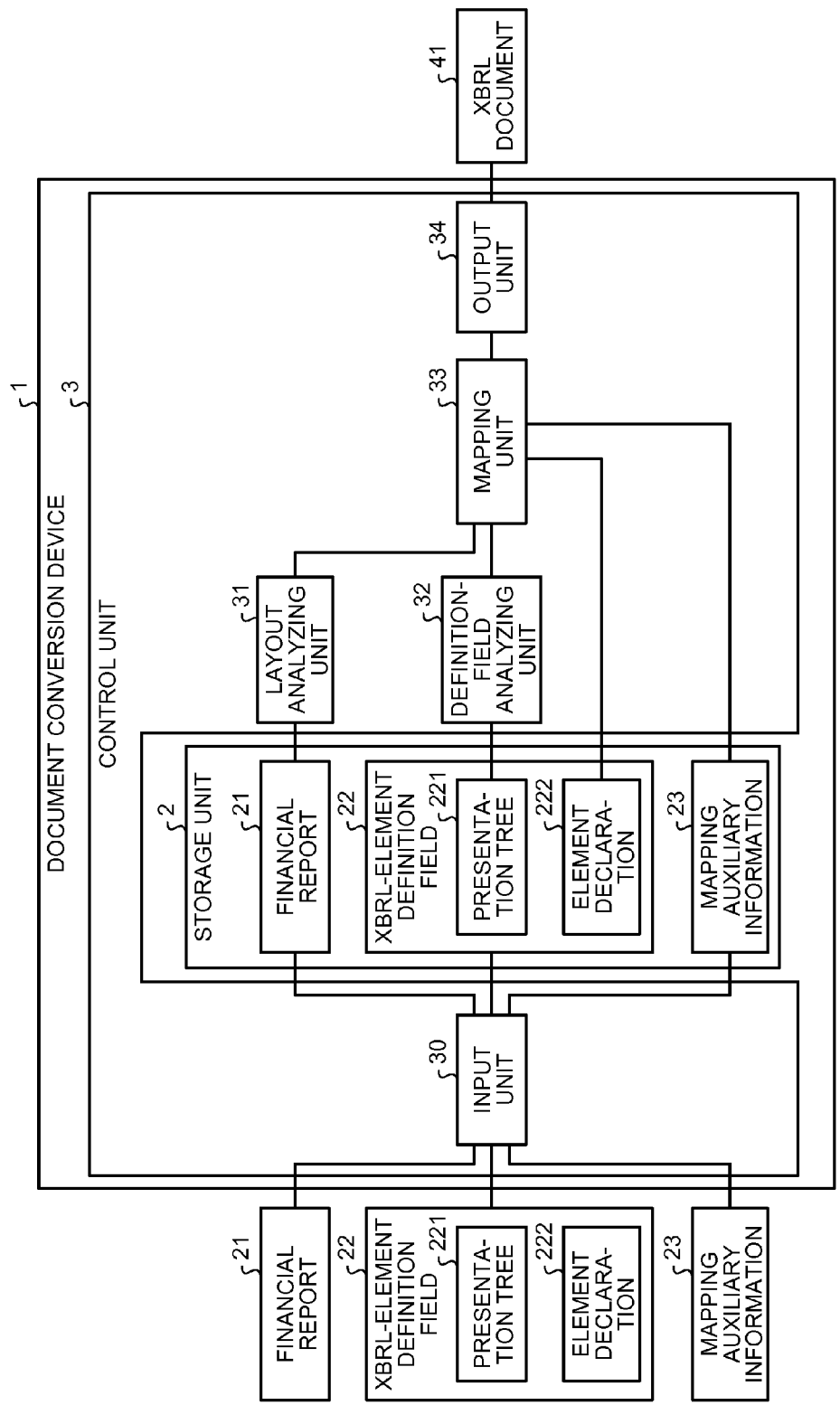

FIG.2

```
┌─────────────────────────────────────────────────────────────────────────┐
│ 【COVER PAGE】                                                           │
│   【FILED REPORT】           ASSET SECURITIES REPORT                     │
│   【EVIDENCE-BASED           FINANCIAL INSTRUMENTS AND                   │
│    ARTICLE】                 EXCHANGE ACT ARTICLE 24-1                   │
│   【FILING DESTINATION】     KANTO FINANCIAL DIRECTOR                    │
│   【FILING DATE】            THE 20TH OF JUNE IN THE 23RD YEAR OF THE HEISEI ERA │
│   【REPORTING PERIOD】       THE 100TH STAGE (FROM 2010/04/01 TO 2011/03/31) │
│   【COMPANY NAME】           AAA CORPORATION                             │
│   【TITLE AND NAME OF        REPRESENTATIVE DIRECTOR TARO NIHON          │
│    REPRESENTATIVE】                                                      │
│   【MAIN OFFICE'S            1-1, SHINJUKU 1-CHOME, SHINJUKU-KU, TOKYO   │
│    LOCATION】                                                            │
│   【PHONE NUMBER】           111(222)333 (MAIN)                          │
└─────────────────────────────────────────────────────────────────────────┘
           21a                    21b
           DOCUMENT               DOCUMENT
           ITEM NAME              ITEM VALUE
```

COVER PAGE (Cover Page)
- FILED REPORT (Report Name)
- EVIDENCE-BASED ARTICLE (Article Number)
- FILING DESTINATION (Filing Destination)
- FILING DATE (Filing Date)
- REPORTING PERIOD (Reporting Period)
  - PERIOD (Stage Of Reporting Period)
  - START DATE (Start Date Of Reporting Period)
  - END DATE (End Date Of Reporting Period)
- COMPANY NAME (Company Name)
- TITLE AND NAME OF REPRESENTATIVE (Representative)
  - TITLE (Title Representative)
  - NAME (Name Representative)
- MAIN OFFICE'S LOCATION (Company Location)
  - ZIP CODE (Zipcode Of Company Location)
  - ADDRESS (Address Of Company Location)
- PHONE NUMBER (Phone Number)

FIG.4

| 222a | 222b | 222c | 222d | 222e | 222f |
|---|---|---|---|---|---|
| DISPLAY NAME | ELEMENT NAME | AB-STRACT ELEMENT FLAG | nil-VALUE ALLOW-ANCE FLAG | DATA TYPE | RESTRIC-TION |
| COVER PAGE | Cover Page | O | × | STRING TYPE | |
| FILED REPORT | Report Name | × | × | STRING TYPE | |
| EVIDENCE-BASED ARTICLE | Article Number | × | × | STRING TYPE | |
| FILING DESTINA-TION | Filing Destination | × | × | STRING TYPE | |
| FILING DATE | Filing Date | × | × | DATE TYPE | |
| REPORTING PERIOD | Reporting Period | O | × | STRING TYPE | |
| PERIOD | Stage Of Reporting Period | × | × | POSITIVE INTEGER TYPE | |
| START DATE | Start Date Of Reporting Period | × | × | DATE TYPE | |
| END DATE | End Date Of Reporting Period | × | × | DATE TYPE | |
| COMPANY NAME | Company Name | × | × | STRING TYPE | |
| TITLE AND NAME OF REPRE-SENTATIVE | Representative | O | × | STRING TYPE | |
| TITLE | Title Representative | × | × | STRING TYPE | |
| NAME | Name Representative | × | × | STRING TYPE | |
| MAIN OFFICE'S LOCATION | Company Location | O | × | STRING TYPE | |
| ZIP CODE | Zipcode Of Company Location | × | O | STRING TYPE | "THREE FIGURES '-'FOUR FIGURES" |
| ADDRESS | Address Of Company Location | × | × | STRING TYPE | |
| PHONE NUMBER | Phone Number | × | × | STRING TYPE | |

FIG.5A

| DISPLAY NAME | ELEMENT NAME | CANDIDATE OF EXPECTED VALUE |
|---|---|---|
| TITLE | Title Representative | REPRESENTATIVE DIRECTOR<br>DIVISION MANAGER<br>ASSISTANT MANAGER<br>DIVISION CHIEF<br>⋮ |
| NAME | Name Representative | TARO NIHON<br>JIRO NIHON<br>⋮ |

| DELETION DOCUMENT ITEM | DELETION CANDIDATE |
|---|---|
| FIRST STRING | 〒<br>Tel<br>⋮ |
| DELIMITER CHARACTER | /<br>⋮ |
| LAST STRING | (MAIN)<br>(DIRECT)<br>⋮ |

232a / 232b — 23-2

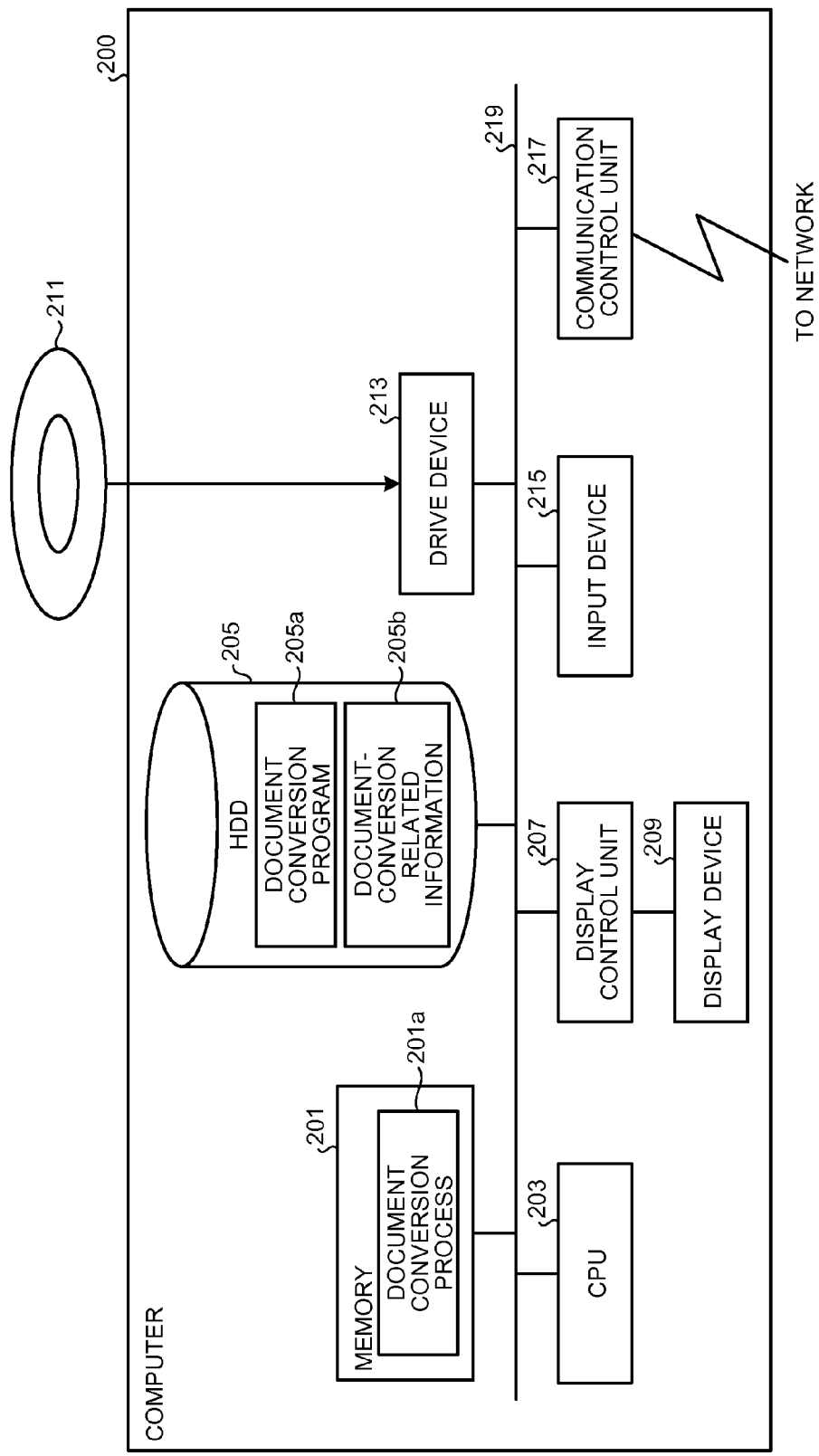

FIG.12

```
【COVER PAGE】
    【FILED REPORT】        ASSET SECURITIES REPORT
    【EVIDENCE-BASED        FINANCIAL INSTRUMENTS AND
    ARTICLE】               EXCHANGE ACT ARTICLE 24-1
    【FILING DESTINATION】   KANTO FINANCIAL DIRECTOR
    【FILING DATE】          THE 20TH OF JUNE IN THE 23RD YEAR OF THE HEISEI ERA
    【REPORTING PERIOD】     THE 100TH STAGE (FROM 2010/04/01 TO 2011/03/31)
    【COMPANY NAME】         AAA CORPORATION
    【TITLE AND NAME OF     REPRESENTATIVE DIRECTOR TARO NIHON
    REPRESENTATIVE】
    【MAIN OFFICE'S         1-1, SHINJUKU 1-CHOME, SHINJUKU-KU, TOKYO
    LOCATION】
    【PHONE NUMBER】         111(222)333 (MAIN)
```

FIG.13

COVER PAGE (Cover Page)
├── FILED REPORT (Report Name)
├── EVIDENCE-BASED ARTICLE (Article Number)
├── FILING DESTINATION (Filing Destination)
├── FILING DATE (Filing Date)
├── [REPORTING PERIOD (Reporting Period)]
├── COMPANY NAME (Company Name)
├── TITLE AND NAME OF REPRESENTATIVE (Representative)
├── MAIN OFFICE'S LOCATION (Company Location)
└── PHONE NUMBER (Phone Number)

DOCUMENT CONVERSION DEVICE, DOCUMENT CONVERSION METHOD, AND RECORDING MEDIUM

CROSS-REFERENCE TO RELATED APPLICATION

This application is a continuation application of International Application No. PCT/JP2012/067870 filed on Jul. 12, 2012 and designating the U.S., the entire contents of which are incorporated herein by reference.

FIELD

The present invention relates to a program, a document conversion device, and a document conversion method.

BACKGROUND

It is mandatory to file financial statements that use XBRL (eXtensible Business Reporting Language) documents to the Financial Services Agency. XBRL documents are the documents that are described in an XBRL that is a report description language based on an XML (eXtensible Markup Language) with regard to, for example, financial accounting statements. Elements (XBRL elements) that are used in XBRL documents have a hierarchical relationship, and the hierarchical relationship is indicated by using a hierarchical document. A company needs to file a financial statement that uses an XBRL document and, before filing it, generates an XBRL document in which each document item included in the financial statement that is a word processing document is related to each element used in the XBRL document.

Furthermore, there is a disclosed technology of a mapping engine for relating each document item of a text document to each element of a hierarchical document. With this technology, the mapping engine receives an input of each document item of a text document in order in accordance with a predetermined relationship and retrieves the hierarchical document's element that corresponds to the document item for which an input is received.

Patent Document 1: Japanese Laid-open Patent Publication No. 2003-316765

However, the above-described technology has a problem in that, when an XBRL document is generated from a financial statement that is a text document, it is sometimes difficult to correctly map a document item of the text document to an element of the hierarchical document. Specifically, as it is assumed that a document item of the text document is related to an element of the hierarchical document on a one-to-one basis, it is difficult to handle cases on a one-to-N basis. Specifically, if a single document item of the text document is related to N elements of the hierarchical document, it is difficult for the mapping engine to correctly map the document item to an appropriate element of the hierarchical document.

FIG. 12 to FIG. 14 are diagrams that illustrate an example in which it is difficult to correctly map a document item of a text document to an element of a hierarchical document. FIG. 12 is a diagram that illustrates an example of each document item of a financial report and its document item value. FIG. 13 and FIG. 14 are diagrams that illustrate an example of the relationship among XBRL elements of the hierarchical document. A mapping engine is capable of mapping the single document item "reporting period" illustrated in FIG. 12 to "reporting period" of the hierarchical document illustrated in FIG. 13. However, with regard to "reporting period" of the hierarchical document illustrated in FIG. 14, there are "stage", "start date", and "end date" on the next hierarchy below. Specifically, as the single document item is related to the three elements, it is difficult for the mapping engine to correctly map the single document item "reporting period" illustrated in FIG. 12 to "reporting period" of the hierarchical document illustrated in FIG. 14.

SUMMARY

According to an aspect of the embodiments, a non-transitory computer-readable recording medium has stored therein a document conversion program converting a first document into a second document that causes a computer to execute a process. The process includes: detecting a first document item in the first document that corresponds to a second document item in the second document that has a child document item in the second document based on a hierarchical document that includes a hierarchical relationship information among document items in the second document, and dividing a content of the first document item; relating the divided content of the first document item to the child document item; and converting the first document into the second document by using the related divided content and the child document item.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram that illustrates a configuration of a document conversion device according to an embodiment;

FIG. 2 is a diagram that illustrates an example of the layout of the cover page of a financial report;

FIG. 3 is a diagram that illustrates an example of the structure of a presentation tree;

FIG. 4 is a diagram that illustrates an example of the data structure of an element declaration;

FIG. 5A is a diagram (1) that illustrates an example of the data structure of mapping auxiliary information;

FIG. 5B is a diagram (2) that illustrates an example of the data structure of the mapping auxiliary information;

FIG. 11 is a diagram that illustrates an example of a computer that executes a document conversion program;

FIG. 12 is a diagram that illustrates each document item of a financial report and its document item value;

FIG. 13 is a diagram (1) that illustrates the relationship among XBRL elements of a hierarchical document.

DESCRIPTION OF EMBODIMENTS

Figure 6:
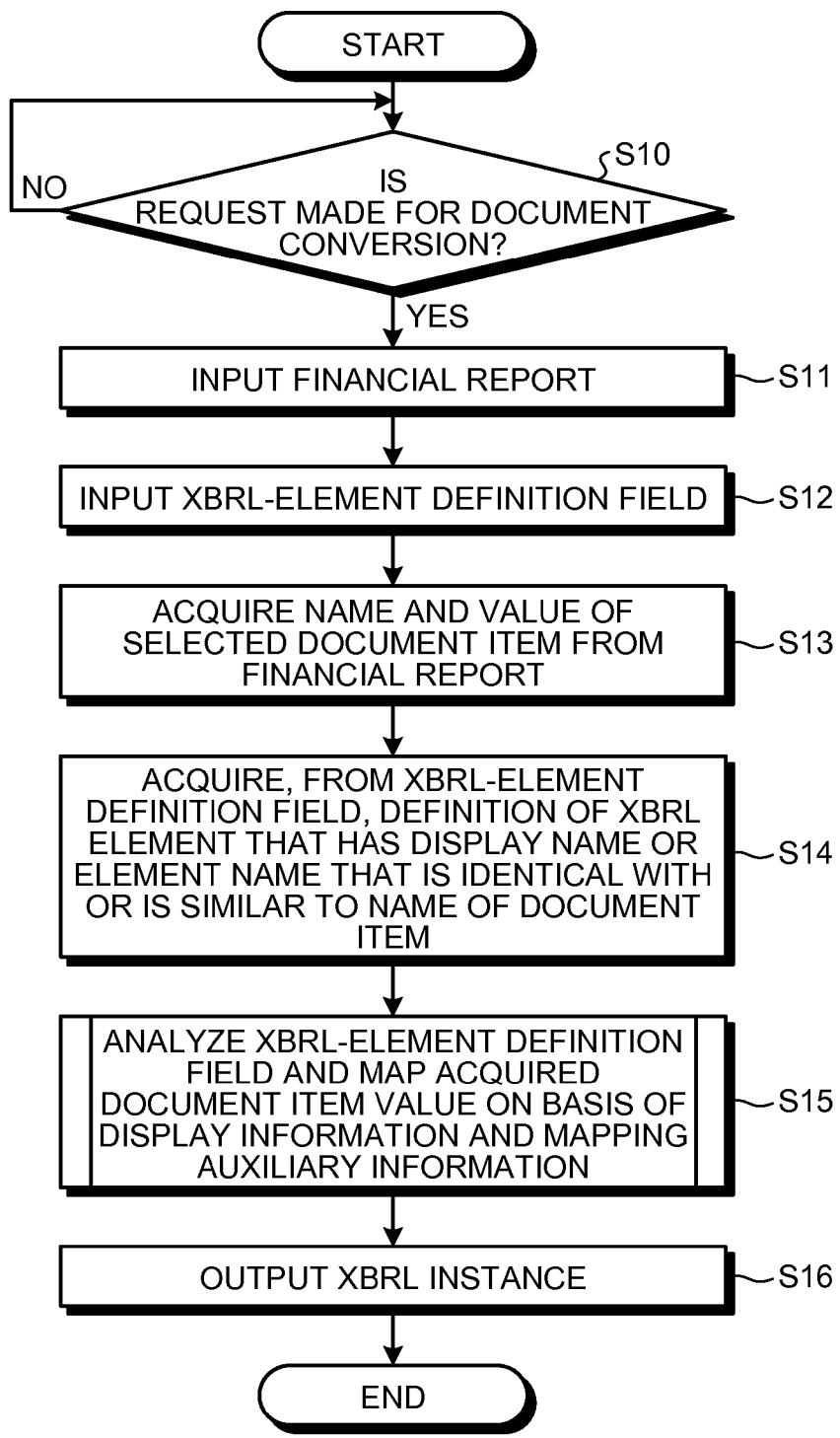
FIG. 6 is a flowchart that illustrates the steps of a primary operation for a document conversion process according to the embodiment.
Figure 7:
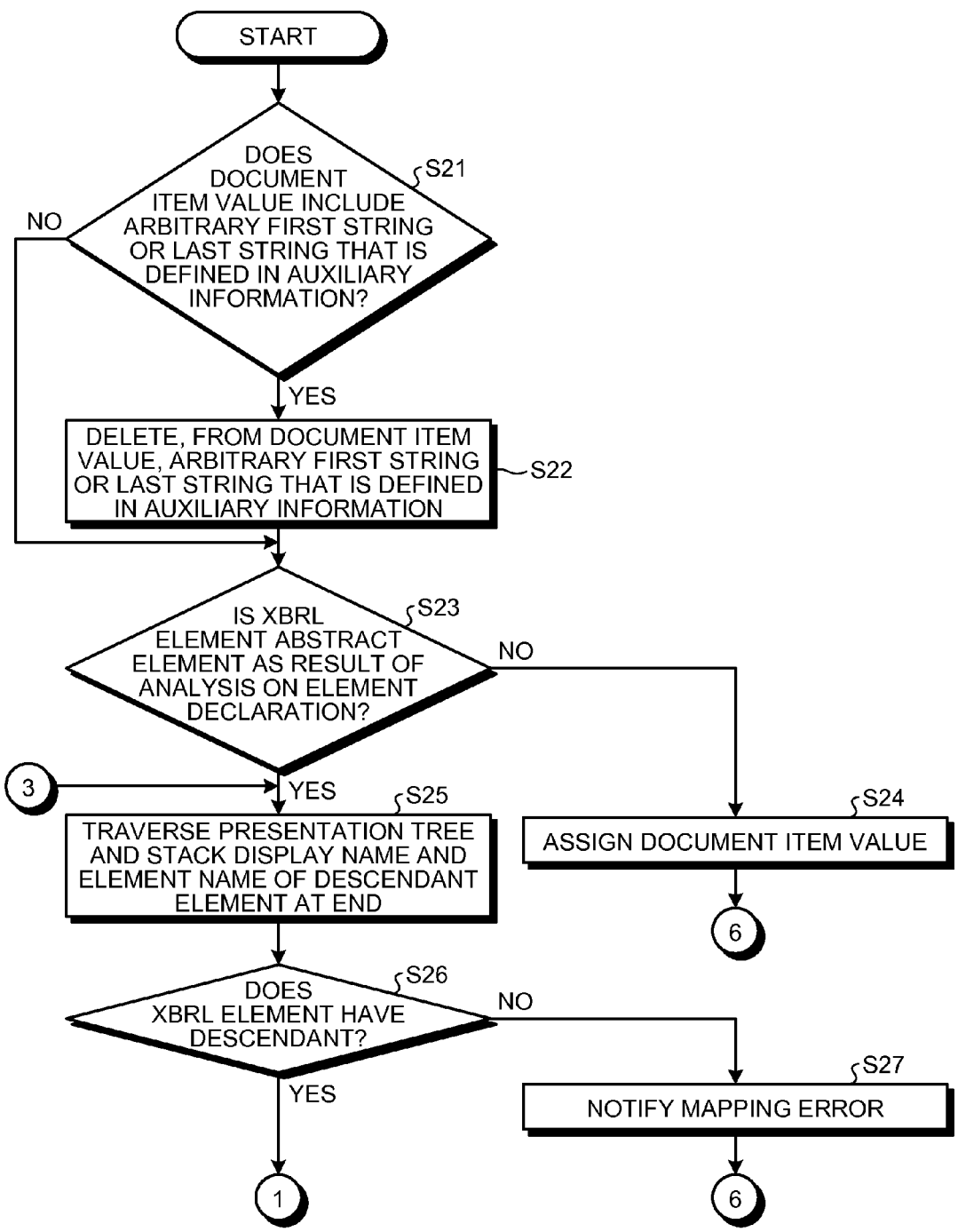
FIG. 7 is a flowchart (1) that illustrates the steps of a mapping operation according to the embodiment.
Figure 8:
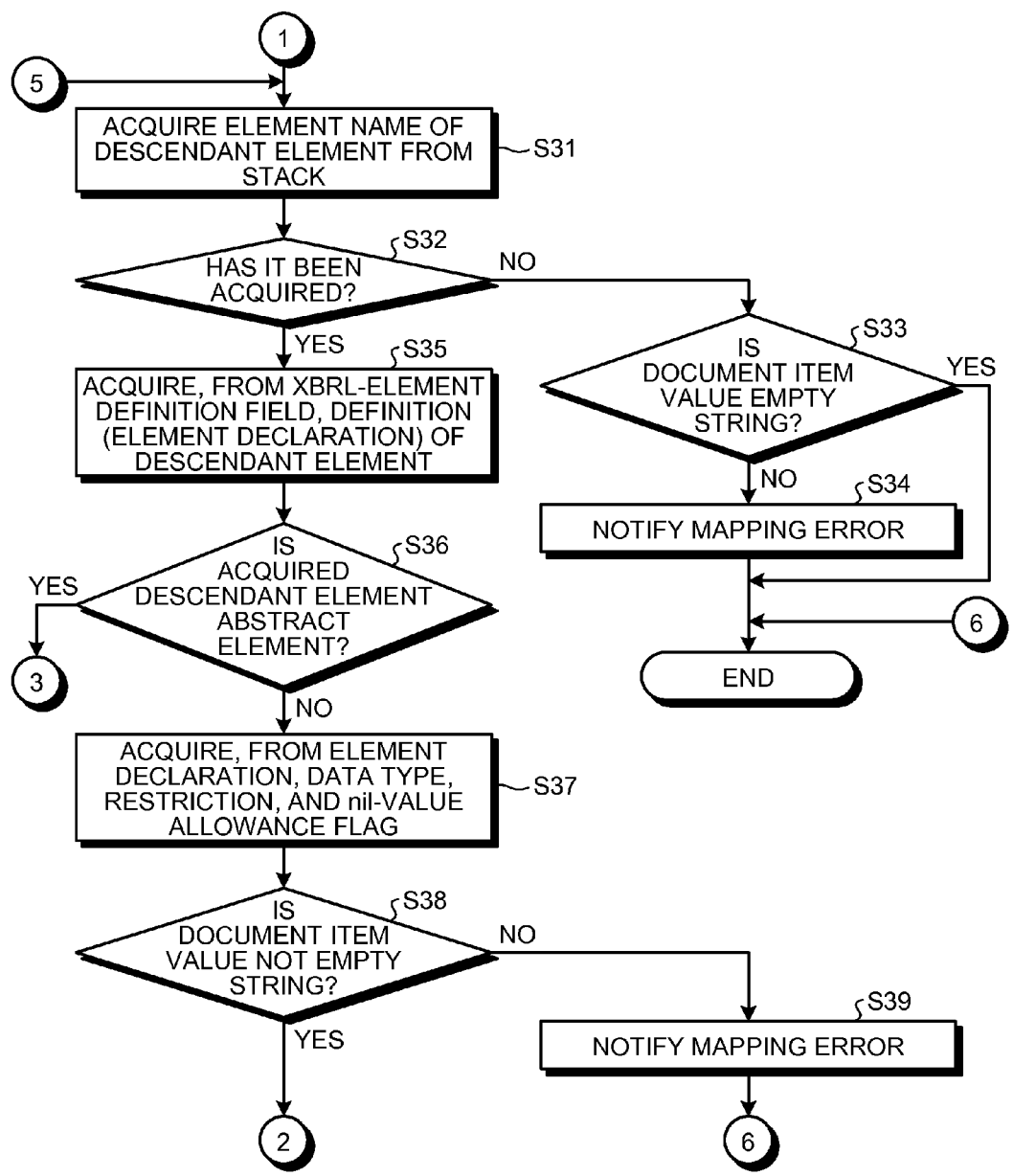
FIG. 8 is a flowchart (2) that illustrates the steps of the mapping operation according to the embodiment.
Figure 9:
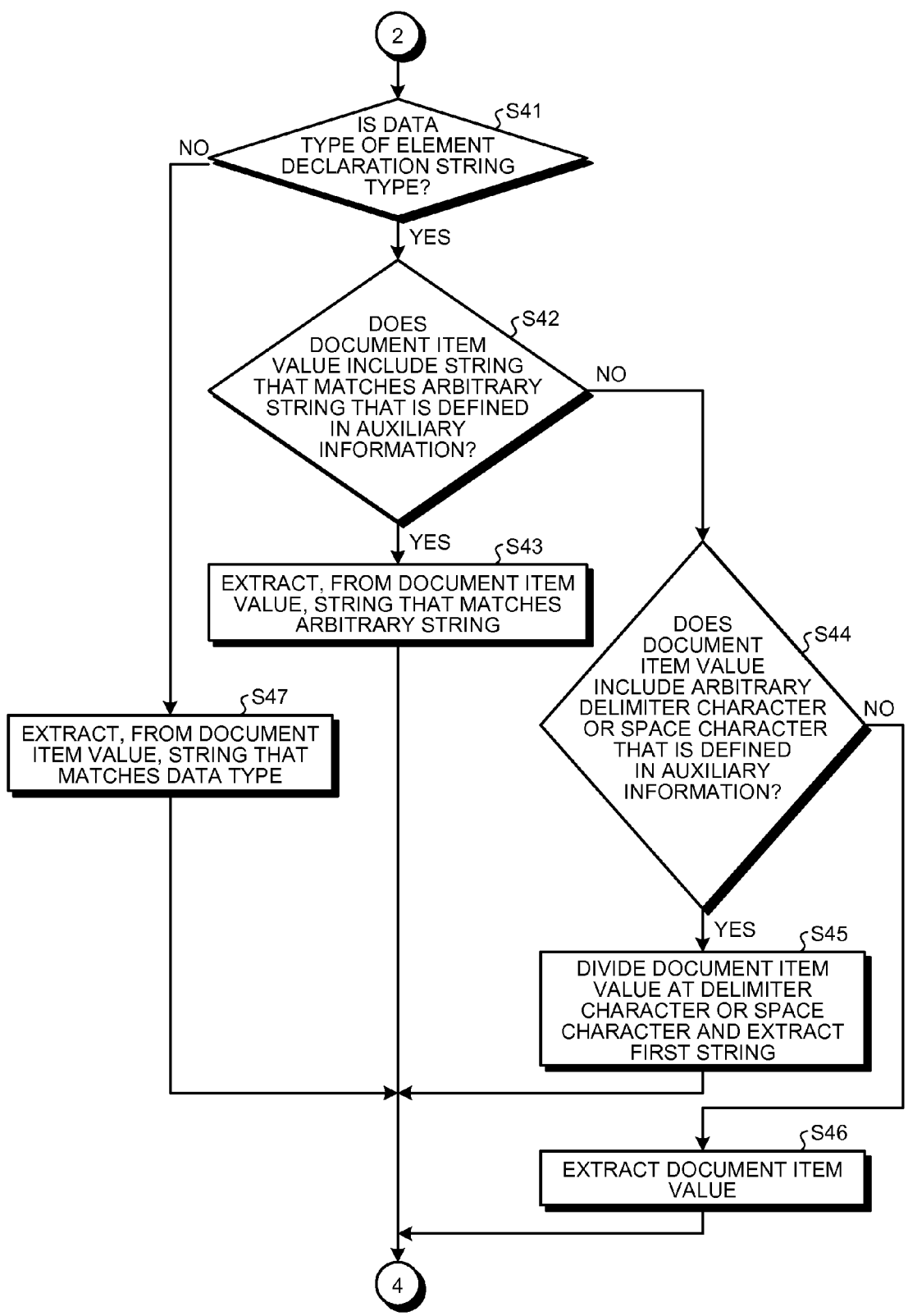
FIG. 9 is a flowchart (3) that illustrates the steps of the mapping operation according to the embodiment.
Figure 10:
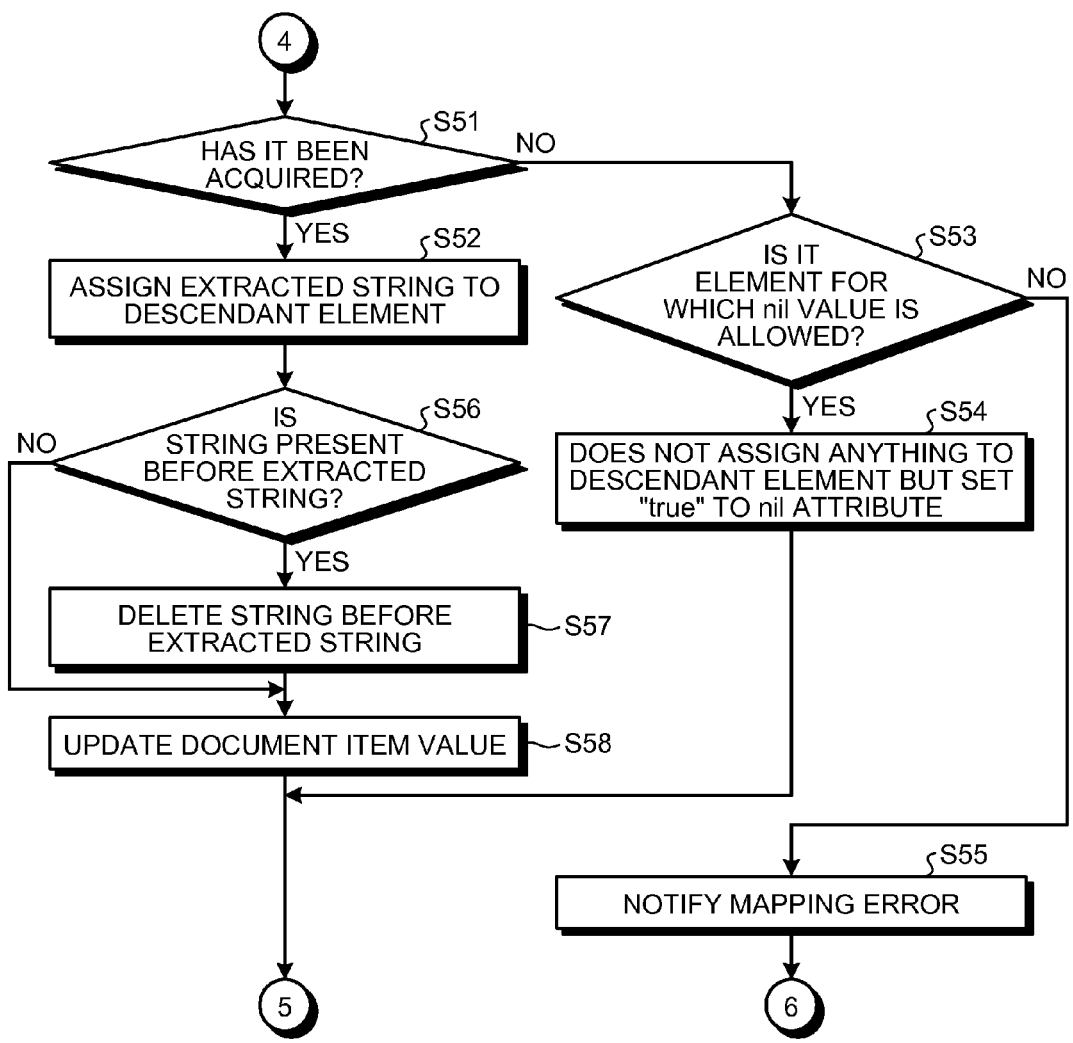
FIG. 10 is a flowchart (4) that illustrates the steps of the mapping operation according to the embodiment.
Figure 14:
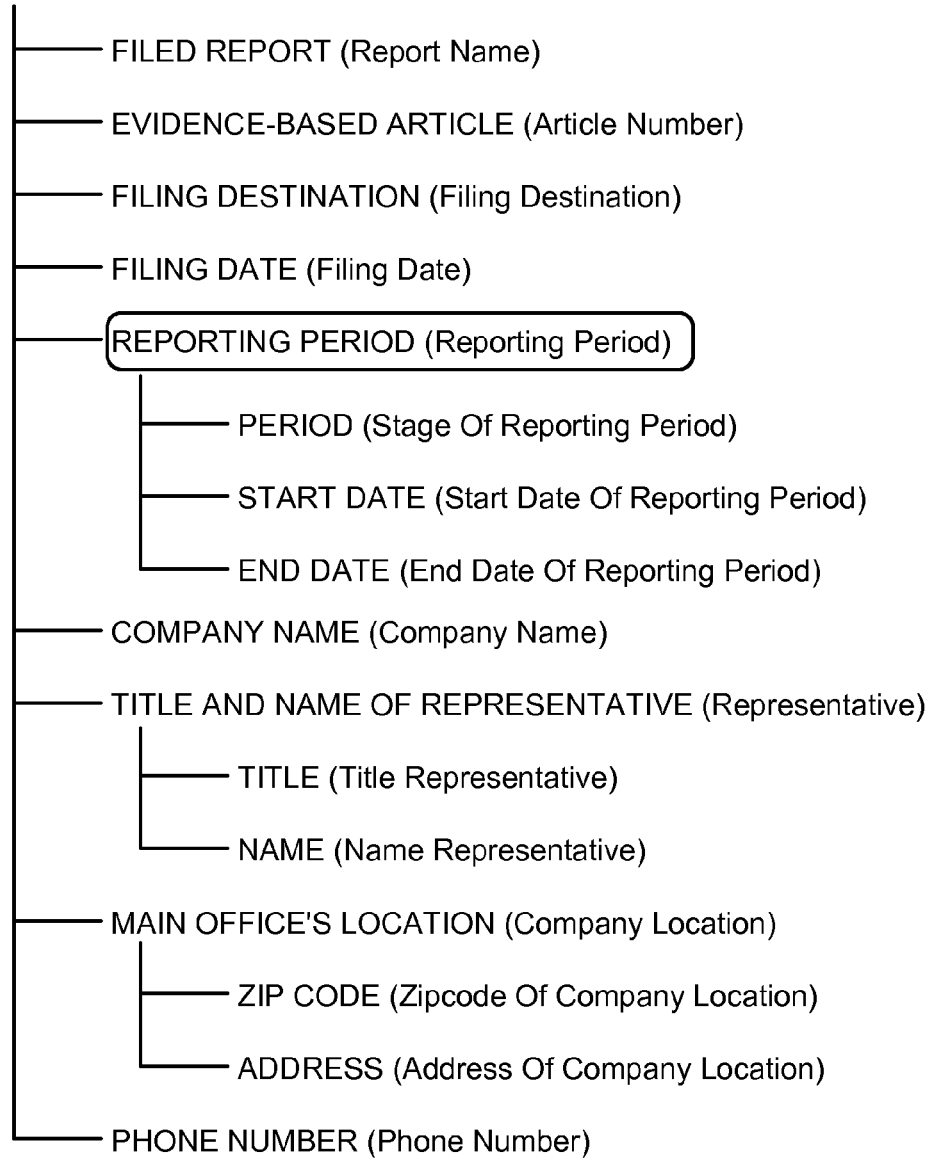
FIG. 14 is a diagram (2) that illustrates the relationship among XBRL elements of the hierarchical document.

Preferred embodiments will be explained with reference to accompanying drawings. The present invention is not limited to the embodiments.

[Configuration of a Document Conversion Device According to the Embodiment]

FIG. 1 is a functional block diagram that illustrates a configuration of a document conversion device according to the embodiment. As illustrated in FIG. 1, a document conversion device 1 inputs a financial report 21, an XBRL-element definition field 22, and mapping auxiliary information 23 and uses the XBRL-element definition field 22 and the mapping auxiliary information 23 to convert the financial report 21 into an XBRL document 41.

The financial report 21 is a financial statement that is generated in a text format (including a word format) and is represented with a document item name and a document item value. Furthermore, an example of the layout of the financial report 21 is described later.

The XBRL-element definition field 22 is a definition field that defines an element (XBRL element) that is used in the XBRL document 41, and it includes a presentation tree 221 and an element declaration 222. Here, the XBRL document 41 is the document that is described in the XBRL that is a report description language based on the XML with regard to financial reports. The XBRL document 41 includes a taxonomy and an instance. The taxonomy defines a scheme of XBRL elements and includes a schema and a linkbase. The schema is the dictionary that stores the name of an XBRL element and attribute information, such as data type, and it corresponds to the element declaration 222 in the embodiment. The linkbase is the document that describes, for example, the parent and child relationship among XBRL elements, the display order, or the display name. Furthermore, the instance (also referred to as an XBRL instance) is the report document that describes a specific value of an XBRL element. Moreover, an explanation is given later of examples of the structures of the presentation tree 221 and the element declaration 222.

The mapping auxiliary information 23 is the auxiliary information that is used when a document item value of the financial report 21 is mapped to an XBRL element. Furthermore, the content of the mapping auxiliary information 23 are described later.

Furthermore, the document conversion device 1 includes a storage unit 2 and a control unit 3.

The storage unit 2 corresponds to a storage device, for example, a non-volatile semiconductor memory device, such as a flash memory (Flash Memory) or FRAM (registered trademark) (Ferroelectric Random Access Memory). Furthermore, the storage unit 2 includes the financial report 21, the XBRL-element definition field 22, and the mapping auxiliary information 23.

The financial report 21 is stored in the storage unit 2 by an input unit 30 that is described later. The XBRL-element definition field 22 is stored in the storage unit 2 by the input unit 30 that is described later. The mapping auxiliary information 23 is stored in the storage unit 2 by the input unit 30 that is described later.

The control unit 3 includes an internal memory that stores programs that define various procedures and control data and uses them to perform various operations. Furthermore, the control unit 3 corresponds to, for example, an integrated circuit, such as an ASIC (Application Specific Integrated Circuit) or FPGA (Field Programmable Gate Array), or an electronic circuit, such as a CPU (Central Processing Unit) or MPU (Micro Processing Unit). Moreover, the control unit 3 includes the input unit 30, a layout analyzing unit 31, a definition-field analyzing unit 32, a mapping unit 33, and an output unit 34.

The input unit 30 inputs the financial report 21 and stores the input financial report 21 in the storage unit 2. Furthermore, the input unit 30 inputs the XBRL-element definition field 22 and stores the input XBRL-element definition field 22 in the storage unit 2. Moreover, the input unit 30 inputs the mapping auxiliary information 23 and stores the input mapping auxiliary information 23 in the storage unit 2. For example, the input unit 30 inputs the financial report 21, the XBRL-element definition field 22, and the mapping auxiliary information 23 with files.

The layout analyzing unit 31 analyzes the layout of the financial report 21. For example, the layout analyzing unit 31 reads the financial report 21 from the storage unit 2 and acquires, from the read financial report 21, the name and the value of a document item that is to be mapped to an XBRL element. Here, an explanation is given of the layout of the financial report 21 with reference to FIG. 2. FIG. 2 is a diagram that illustrates an example of the layout of the cover page of a financial report. As illustrated in FIG. 2, a document item name 21a and a document item value 21b are described in the cover page of the financial report 21. The document item name 21a indicates the name of a document item. The document item value 21b indicates the value (string) with regard to a document item name. For example, if the document item name 21a is "filed report", "asset securities report" is described as the document item value 21b. If the document item name 21a is "reporting period", "the 100th stage (from 2010/04/01 to 2011/03/31" is described as the document item value 21b.

The definition-field analyzing unit 32 analyzes the XBRL-element definition field 22. For example, the definition-field analyzing unit 32 reads the XBRL-element definition field 22 from the storage unit 2. Then, the definition-field analyzing unit 32 acquires, from the presentation tree 221 of the XBRL-element definition field 22, an XBRL element that has a display name or element name that is identical with or is similar to the financial report 21's document item name that is to be mapped to any XBRL element. Then, the definition-field analyzing unit 32 acquires the element declaration of the acquired XBRL element from the element declaration 222 of the XBRL-element definition field 22. Here, the structures of the presentation tree 221 and the element declaration 222 are explained with reference to FIG. 3 and FIG. 4.

FIG. 3 is a diagram that illustrates an example of the structure of the presentation tree. As illustrated in FIG. 3, the presentation tree 221 uses a tree structure to indicate the relationship among elements for display of XBRL elements. An XBRL element is indicated by using a display name and an element name. For example, if a display name is "filed report", "ReportName" is described as an element name. There are no elements that have a descendant relationship with the XBRL element. Furthermore, for another example, if a display name is "reporting period", "ReportingPeriod" is described as an element name. There are XBRL elements that have a descendant relationship with the XBRL element and that have the display names of "stage", "start date", and "end date". If the display name is "stage", "StageOfReportingPeriod" is described as an element name. If the display name is "start date", "StartDateOfReportingPeriod" is described as an element name. If the display name is "end date", "EndDateOfReportingPeriod" is described as an element name.

FIG. 4 is a diagram that illustrates an example of the data structure of the element declaration. As illustrated in FIG. 4, the element declaration 222 stores an element name 222b, an abstract element flag 222c, a nil-value allowance flag 222d, a data type 222e, and a restriction 222f in a related manner. Furthermore, for the convenience of explanation, the element declaration 222 describes a display name 222a that is the display name of an XBRL element and that is the display name that corresponds to the element name 222b. The element name 222b indicates the element name of an XBRL element. The abstract element flag 222c is the flag that indicates whether it is an abstract element (index) to which a specific value is not mapped. If it is an abstract element, for example, "o" is set, and if it is not an abstract element, for example, "x" is set. The nil-value allowance flag 222d is the flag that indicates whether it is an element for which a nil value is allowed. If it is an element for which a nil value is allowed, for example, "o" is set, and if it is an element for which a nil value is not allowed, for example, "x" is set. Furthermore, a nil value is synonymous with a NULL value (null value), and it means that no value is contained. The data type 222e indicates the data type of a value to be mapped. For example, "string type" is set in the case of a string, "date type" in the case of a date, and "positive integer type" in the case of a positive integer. The restriction 222f indicates the restriction on the format of a value that is to be mapped to an element. For example, if there is a restriction on the format for a hyphen between three figures and four figures, that information is set.

For example, if the display name 222a is "reporting period", "o" is set as the abstract element flag 222c, "x" as the nil value flag 222d, and "string type" as the data type 222e. If the display name 222a is "stage", "x" is set as the abstract element flag 222c, "x" as the nil value flag 222d, and "positive integer type" as the data type 222e. If the display name 222a is "start date", "x" is set as the abstract element flag 222c, "x" as the nil value flag 222d, and "date type" as the data type 222e.

Returning to FIG. 1, the mapping unit 33 uses the XBRL-element definition field 22 to detect, from the document items included in the financial report 21, the document item that corresponds to an element that has a descendant in the XBRL document 41. For example, the mapping unit 33 uses the element declaration of the XBRL element that is acquired by the definition-field analyzing unit 32 to determine whether the XBRL element is an abstract element. Then, if it is determined that the XBRL element is an abstract element, the mapping unit 33 uses the parent-child relationship between XBRL elements in the presentation tree 221 to determine whether the XBRL element is hierarchized in the presentation tree 221, i.e., it has a descendant element. Then, if it is determined that the XBRL element is hierarchized in the presentation tree 221, the mapping unit 33 determines that the XBRL element is an element that is made up of some elements. Specifically, the mapping unit 33 detects that the document item that is to be mapped to the XBRL element is the document item for which its document item value needs to be divided.

The mapping unit 33 uses the XBRL-element definition field 22 to divide the document item value of the detected document item and map each value of the divided document item values to a descendant element of the related XBRL element. For example, the mapping unit 33 selects, from the presentation tree 221, the descendant elements of the XBRL element that corresponds to the detected document item in the order they appear. Then, the mapping unit 33 acquires, from the element declaration 222, the element declaration that corresponds to the selected descendant element. Then, the mapping unit 33 extracts, from the document item value of the detected document item, the portion that matches the data type 222e in the acquired element declaration and maps the extracted portion to the descendant element being selected. Here, if it is difficult to extract the portion that matches the data type 222e from the document item value, and if the descendant element being selected is the element for which a nil value is allowed, the mapping unit 33 determines that an input of the document item value is skipped. Then, the mapping unit 33 does not map anything to the descendant element being selected. Then, the mapping unit instead sets "true" that indicates a nil value to the nil attribute that is the attribute related to a nil value. Furthermore, the nil-value allowance flag 222d in the element declaration of a descendant element is used to determine whether it is an element for which a nil value is allowed.

As a specific example, an explanation is given of a case where the document item "reporting period" of the financial report 21 illustrated in FIG. 2 is mapped to the XBRL element "reporting period" in the presentation tree 221 illustrated in FIG. 3. Furthermore, it is assumed that the element declaration 222 illustrated in FIG. 4 is used as the element declaration of the XBRL element. The mapping unit 33 uses the element declaration of the XBRL element "reporting period" to determine whether the XBRL element is an abstract element. Here, as the abstract element flag 222c of the element declaration of the XBRL element "reporting period" in the element declaration 222 illustrated in FIG. 4 is "o", the mapping unit 33 determines that the XBRL element "reporting period" is an abstract element.

Then, as it is determined that the XBRL element "reporting period" is an abstract element, the mapping unit 33 uses the parent-child relationship among the XBRL elements in the presentation tree 221 to determine whether the XBRL element "reporting period" has a descendant element in the presentation tree 221. Here, the mapping unit 33 uses the presentation tree 221 illustrated in FIG. 3 to determine that the XBRL element "reporting period" has three descendant elements, i.e., "stage", "start date", and "end date". Therefore, the mapping unit 33 determines that the XBRL element "reporting period" is made up of three elements. Specifically, the mapping unit 33 detects that the document item "reporting period" that is to be mapped to the XBRL element "reporting period" is the document item for which its document item value needs to be divided.

Then, the mapping unit 33 sequentially selects, from the presentation tree 221, the descendant elements of the XBRL element "reporting period" that corresponds to the detected document item "reporting period". Here, the mapping unit 33 sequentially selects, from the presentation tree 221 illustrated in FIG. 3, the descendant elements "stage", "start date", and "end date" of the XBRL element "reporting period". Then, the mapping unit 33 extracts, from the document item value of the detected document item "reporting period", the portion that matches the data type 222e in the element declaration that corresponds to the selected descendant element. Then, the mapping unit 33 maps the extracted portion to the selected descendant element.

Here, as illustrated in FIG. 2, the document item value 21b of the document item name 21a "reporting period" is "the 100th stage (from 2010/04/01 to 2011/03/31)". Therefore, the mapping unit 33 extracts, from the document item value 21b, "100" that is the portion that matches the data type 222e "positive integer type" of the descendant element "stage". Then, the mapping unit 33 maps the extracted portion "100" to the descendant element "stage". The following tag is the result when the XBRL document 41 is output.
<StageOfReportingPeriod>100</StageOfReportingPeriod>

Furthermore, the mapping unit 33 extracts, from the document item value 21b, "the 1st of April in the 22nd year of the Heisei era" that is the portion that matches the data type 222e "date type" of the descendant element "start date". Then, the mapping unit 33 maps the extracted portion to the descendant element "start date". The following tag is the result when the XBRL document 41 is output. Moreover, in the following example, it is assumed that the extracted portion is mapped after it is converted from the Japanese calendar into the Western calendar.
<StartDateOfReportingPeriod>2010-04-01</StartDateOfReportingPeriod>

Furthermore, the mapping unit 33 extracts, from the document item value 21b, "the 31st of March in the 23rd year of the Heisei era" that is the portion that matches the data type 222e "date type" of the descendant element "end date". Then, the mapping unit 33 maps the extracted portion to the descendant element "end date". The following tag is the result when the XBRL document 41 is output. Furthermore, in the following example, it is assumed that the extracted portion is mapped after it is converted from the Japanese calendar into the Western calendar.
<EndDateOfReportingPeriod>2011-03-31</EndDateOfReportingPeriod>

For another specific example, an explanation is given of a case where the document item name 21a "main office's location" of the document item in the financial report 21 illustrated in FIG. 2 is mapped to the XBRL element "main office's location" in the presentation tree 221 illustrated in FIG. 3. Moreover, the element declaration 222 illustrated in FIG. 4 is used as the element declaration of the XBRL element. The mapping unit 33 uses the element declaration of the XBRL element "main office's location" to determine whether the XBRL element is an abstract element. Here, the mapping unit 33 determines that the XBRL element "main office's location" is an abstract element as the abstract element flag 222c of the element declaration of the XBRL element "main office's location" in the element declaration 222 illustrated in FIG. 4 is "o".

Then, as the mapping unit 33 determines that the XBRL element "main office's location" is an abstract element, it is determined whether the XBRL element "main office's location" has a descendant element in the presentation tree 221 by using the parent-child relationship among the XBRL elements in the presentation tree 221. Here, the mapping unit 33 determines that the XBRL element "main office's location" has two descendant elements, i.e., "zip code" and "address" by using the presentation tree 221 illustrated in FIG. 3. Therefore, the mapping unit 33 determines that the XBRL element "main office's location" is made up of two elements. Specifically, the mapping unit 33 detects that the document item "main office's location", which is to be mapped to the XBRL element "main office's location", is the document item for which its document item value needs to be divided.

Then, the mapping unit 33 sequentially selects, from the presentation tree 221, the descendant elements of the XBRL element "main office's location" that corresponds to the document item name 21a "main office's location" of the detected document item. Here, the mapping unit 33 sequentially selects, from the presentation tree 221 illustrated in FIG. 3, the descendant elements "zip code" and "address" of the XBRL element "main office's location". Then, the mapping unit 33 extracts, from the document item value 21b of the document item name 21a "main office's location" of the detected document item, the portion that matches the data type 222e and the restriction 222f in the element declaration that corresponds to the selected descendant element. Then, the mapping unit 33 maps the extracted portion to the selected descendant element.

Here, as illustrated in FIG. 2, the document item value 21b of the document item name 21a "main office's location" of the document item is "1-1, Shinjuku 1-chome, Shinjuku-ku, Tokyo". Therefore, the mapping unit 33 tries to extract, from the document item value 21b, the portion that matches the data type 222e "string type" of the descendant element "zip code" and the restriction 222f "three figures'-'four figures". However, it is difficult for the mapping unit 33 to extract, from the document item value, the portion that matches the data type 222e and the restriction 222f. Therefore, as the nil-value allowance flag 222d of the selected descendant element "zip code" is "o", the mapping unit 33 determines that the descendant element "zip code" is the element for which a nil value is allowed. Then, the mapping unit 33 determines that an input of the document item value is skipped, does not map anything to the selected descendant element "zip code", and instead sets "true" to the nil attribute. The following tag is the result with regard to the descendant element "zip code" when the XBRL document 41 is output.
<ZipcodeOfCompanyLocation nil="true"/>

Furthermore, the mapping unit 33 extracts, from the document item value, the portion "1-1, Shinjuku 1-chome, Shinjuku-ku, Tokyo" that matches the data type 222e "string type" of the descendant element "address". Then, the mapping unit 33 maps the extracted portion to the descendant element "address". The following tag is the result when the XBRL document 41 is output.
<AddressOfCompanyLocation>1-1, Shinjuku 1-chome, Shinjuku-ku, Tokyo</AddressOfCompanyLocation>

Thus, when the XBRL document 41 is generated from the financial report 21, the mapping unit 33 is capable of correctly mapping a document item of the financial report 21 to an element of the presentation tree 221 that has the hierarchical relationship among XBRL elements.

The output unit 34 outputs an XBRL instance that indicates the result of mapping performed by the mapping unit 33. In the embodiment, the XBRL instance is the XBRL document 41. For example, the output unit 34 may output, to a monitor, the XBRL document 41 that is a mapping result or may store it in the storage unit 2.

Furthermore, in some cases, the string type that does not include the restriction 222f is designated as the data type 222e of an XBRL element in the element declaration 222. In such a case, it is sometimes difficult for the mapping unit 33 to extract only an expected value from an appropriate document item value. For example, an explanation is given of a case where the document item value 21b of the document item name 21a "title and name of representative" of the document item in the financial report 21 illustrated in FIG. 2 is mapped to the XBRL element "title and name of representative" in the presentation tree 221 illustrated in FIG. 3. The mapping unit 33 uses the presentation tree 221 illustrated in FIG. 3 to determine that the XBRL element "title and name of representative" has two descendant elements "title" and "name". Then, the mapping unit 33 extracts, from the document item value 21b "representative director Taro Nihon" of the document item name 21a "title and name of representative", the portion that matches the data type 222e "string type" of the descendant element "title". Here, although the mapping unit 33 needs to extract, from the document item value 21b, "representative director" that is the expected value that corresponds to the descendant element "title", it extracts the entire document item value 21b "representative director Taro Nihon". That is, the mapping unit 33 is not capable of extracting only the expected value from the document item value 21b.

Therefore, it is preferable that the document conversion device 1 previously stores, in mapping auxiliary information 23-1 that is the auxiliary information for mapping, the expected value that corresponds to the XBRL element and that needs to be extracted from the document item value 21b. FIG. 5A is a diagram that illustrates an example of the data structure of the mapping auxiliary information. As illustrated in FIG. 5A, the mapping auxiliary information 23-1 stores a display name 231a, an element name 231b, and an expected-value candidate 231c in a related manner. The display name 231a is the display name of an XBRL element. The element name 231b is the element name of an XBRL element. The expected-value candidate 231c indicates a candidate of the expected value that corresponds to an XBRL element. For example, if the display name 231a is "title", "representative director", "division manager", "assistant manager", and "division chief" are stored as the expected-value candidate 231c. If the display name 231a is "name", "Taro Nihon" and "Jiro Nihon" are stored as the expected-value candidate 231c.

By using the above mapping auxiliary information 23-1, the mapping unit 33 extracts, from the document item value 21b, the portion that matches the data type 222e "string type" of an XBRL element. Specifically, the mapping unit 33 uses the mapping auxiliary information 23-1 to extract, from the document item value 21b, the value that matches the expected-value candidate 231c that corresponds to an XBRL element. Here, the mapping unit 33 uses the mapping auxiliary information 23-1 to extract, from the document item value 21b "representative director Taro Nihon", "representative director" that is the portion that matches the data type 222e "string type" of the descendant element "title". Furthermore, the mapping unit 33 uses the mapping auxiliary information 23-1 to extract, from the document item value 21b "representative director Taro Nihon", "Taro Nihon" that is the portion that matches the data type 222e "string type" of the descendant element "name".

Furthermore, another example is given below in which it is difficult for the mapping unit 33 to extract only the expected value from the appropriate document item value 21b. An explanation is given of a case where the document item value 21b of the document item name 21a "phone number" of the document item in the financial report 21 illustrated in FIG. 2 is mapped to the XBRL element "phone number" in the presentation tree 221 illustrated in FIG. 3. The mapping unit 33 extracts, from the document item value 21b "111(222)3333(main)" of the document item "phone number", the portion that matches the data type 222e "string type". Here, although the mapping unit 33 needs to extract, from the document item value, "111(222)3333" as the expected value that corresponds to the XBRL element "phone number", it extracts "111(222)3333(main)" that includes the last character "(main)". That is, it is difficult for the mapping unit 33 to extract only the expected value from the document item value. Here, a possible way for the mapping unit 33 to extract "111(222)3333" from the document item value 21b is that the format to be extracted is designated in the restriction 222f of the element declaration 222. However, a phone number contains various delimiter characters (e.g., "(", ")", "-", " ") as delimiter characters for the area code and the local office number. Therefore, the data type 222e of the XBRL element "phone number" needs to be a simple string type for which there is no designation in the restriction 222f.

Therefore, it is preferable that the document conversion device 1 previously stores, in mapping auxiliary information 23-2 that is the auxiliary information for mapping, an unnecessary string that can be included in the document item value 21b. In other words, the document conversion device 1 previously stores, in the mapping auxiliary information 23-2, a string that can be deleted from the document item value 21b. FIG. 5B is a diagram that illustrates an example of the data structure of the mapping auxiliary information. As illustrated in FIG. 5B, the mapping auxiliary information 23-2 stores a deletion document item 232a and a deletion candidate 232b in a related manner. The deletion document item 232a indicates the document item of a string that can be deleted from the document item value 21b. The deletion candidate 232b indicates a string that corresponds to a deletion document item and that can be deleted. For example, if the deletion document item 232a is "first string", "T" and "Tel" are stored as the deletion candidate 232b. If the deletion document item 232a is "delimiter character", "." and "/" are stored as the deletion candidate 232b. If the deletion document item 232a is "last string", "(main)" and "(direct)" are stored as the deletion candidate 232b.

If the document item value 21b contains the deletion candidate 232b that corresponds to the deletion document item 232a, the mapping unit 33 uses the above mapping auxiliary information 23-2 to delete the portion from the document item value 21b. Here, as the document item value 21b "111(222)3333(main)" contains "(main)" that corresponds to the deletion document item 232a "last string", the mapping unit 33 deletes the portion from the document item value 21b. As a result, the mapping unit 33 uses the mapping auxiliary information 23-2 to extract "111(222)3333" from the document item value 21b.

[Primary Operation for a Document Conversion Process]

Next, an explanation is given, with reference to FIG. 6, of the steps of a primary operation for a document conversion process according to the embodiment. FIG. 6 is a flowchart that illustrates the steps of a primary operation for a document conversion process according to the embodiment. Furthermore, in FIG. 6, an explanation is given of a case where, with regard to the Word-format financial report 21, the value of a document item to be tagged is mapped to an XBRL element on the Word screen for a conversion into the XBRL document 41.

First, the control unit 3 determines whether a request is made for a document conversion into the XBRL document 41 (Step S10). For example, the control unit 3 determines whether the document item to be tagged is selected on the Word screen so as to determine whether a request is made for a document conversion into the XBRL document 41. If it is determined that a request is not made for a document conversion (Step S10; No), the control unit 3 repeats a determination operation until a request is made for a document conversion.

Conversely, if it is determined that a request is made for a document conversion (Step S10; Yes), the input unit 30 inputs the financial report 21 (Step S11) and stores it in the storage unit 2. Then, the input unit 30 inputs the XBRL-element definition field 22 (Step S12) and stores it in the storage unit 2.

Next, the layout analyzing unit 31 reads the financial report 21 from the storage unit 2 and acquires, from the read financial report 21, the name (document item name) and the value (document item value) of the selected document item (Step S13).

Then, the definition-field analyzing unit 32 reads the XBRL-element definition field 22 from the storage unit 2 and acquires, from the read XBRL-element definition field 22, the definition of the XBRL element that has a display name or element name that is identical with or is similar to the name of the document item (Step S14). For example, the definition-field analyzing unit 32 acquires, from the presentation tree 221, the XBRL element that has a display name or element name that is identical with or is similar to the name of the document item that is to be mapped to the XBRL element. Then, the definition-field analyzing unit 32 acquires, from the element declaration 222, the element declaration of the acquired XBRL element.

Next, the mapping unit 33 analyzes the element declaration that is the definition of the acquired XBRL element and, based on the display information and the mapping auxiliary information 23, maps the acquired document item value to the XBRL element (Step S15). Furthermore, the display information includes the presentation tree 221 and the element declaration 222.

Then, the output unit 34 outputs the result of the mapping performed by the mapping unit 33 as an XBRL instance (the XBRL document 41) (Step S16). Specifically, the output unit 34 outputs the XBRL instance to, for example, the storage unit 2. Thus, the document conversion device 1 terminates the document conversion process for converting the financial report 21 into the XBRL document 41.

[Steps of a Mapping Operation]

Next, an explanation is given, with reference to FIG. 7 to FIG. 10, of the steps of a mapping operation at S15 illustrated in FIG. 6. FIG. 7 to FIG. 10 are flowcharts that illustrate the steps of the mapping operation according to the embodiment.

First, the mapping unit 33 determines whether the document item value includes an arbitrary first string or last string that is defined in the mapping auxiliary information 23 (Step S21). This allows an unnecessary string to be deleted from the document item value. For example, it is such a case where "(main)" that is the last string is deleted if the document item value is "111(222)3333(main)".

Then, if it is determined that the document item value includes an arbitrary first string or last string (Step S21; Yes), the mapping unit 33 deletes, from the document item value, an arbitrary first string or last string that is defined in the mapping auxiliary information 23 (Step S22). Specifically, the string from which the string that is determined to be included has been deleted is set as the document item value. Then, the mapping unit 33 proceeds to Step S23. Conversely, if it is determined that the document item value does not include an arbitrary first string and last string (Step S21; No), the mapping unit 33 proceeds to Step S23.

At Step S23, the mapping unit 33 analyzes the element declaration of the XBRL element that corresponds to the name of the document item and, as a result, determines whether the XBRL element is an abstract element (Step S23). If it is determined that the XBRL element is not an abstract element (Step S23; No), the mapping unit 33 assigns the document item value to the XBRL element (Step S24). Then, the mapping unit 33 terminates the mapping operation.

Conversely, if it is determined that the XBRL element is an abstract element (Step S23; Yes), the mapping unit 33 traverses the presentation tree 221 and stacks the display name and the element name of the descendant element at the end with respect to the XBRL element (Step S25). Then, the mapping unit 33 determines whether the XBRL element has a descendant (Step S26). Here, the mapping unit 33 determines whether the XBRL element has a descendant based on whether stacking has been performed with regard to the XBRL element. Then, if it is determined that the XBRL element has a descendant (Step S26; Yes), the mapping unit 33 proceeds to Step S31 to perform a mapping operation on the descendant element.

Conversely, if it is determined that the XBRL element does not have a descendant (Step S26; No), the mapping unit 33 notifies a mapping error to a requester of the document conversion as the XBRL element does not have a descendant although it is an abstract element (Step S27). Then, the mapping unit 33 terminates the mapping operation.

At Step S31, the mapping unit 33 acquires, from the stack, the element name of the descendant element (Step S31) and determines whether it has been acquired (Step S32). Here, if it is determined that it has not been acquired (Step S32; No), the mapping unit 33 further determines whether the document item value is an empty string (Step S33). If it is determined that the document item value is an empty string (Step S33; Yes), the mapping unit 33 determines that the entire mapping has been completed and terminates the mapping operation.

Conversely, if it is determined that the document item value is not an empty string (Step S33; No), the mapping unit 33 notifies a mapping error to a requester of the document conversion as a descendant element has not been acquired although the document item value still contains data (Step S34). Then, the mapping unit 33 terminates the mapping operation.

Conversely, if it is determined that the element name of the descendant element has been acquired from the stack (Step S32; Yes), the mapping unit 33 acquires, from the XBRL-element definition field 22, the element declaration that is the definition of the acquired descendant element (Step S35). The mapping unit 33 determines whether the descendant element being processed is an abstract element as a result of an analysis on the acquired element declaration (Step S36). If it is determined that the descendant element being processed is an abstract element (Step S36; Yes), the mapping unit 33 proceeds to Step S25 to stack a descendant element that is located on a lower level of the hierarchy than the descendant element being processed.

Conversely, if it is determined that the descendant element being processed is not an abstract element (Step S36; No), the mapping unit 33 acquires, from the acquired element declaration, the data type 222*e*, the restriction 222*f*, and the nil-value allowance flag 222*d* (Step S37). Then, the mapping unit 33 determines whether the document item value is not an empty string (Step S38). If it is determined that the document item value is an empty string (Step S38; No), the mapping unit 33 notifies a mapping error to a requester of the document conversion as it is difficult to map the document item value to the descendant element being processed (Step S39). Then, the mapping unit 33 terminates the mapping operation.

Conversely, if it is determined that the document item value is not an empty string (Step S38; Yes), the mapping unit 33 proceeds to Step S41 to further perform the mapping operation. At Step S41, the mapping unit 33 determines whether the data type 222*e* of the element declaration of the descendant element being processed is a string type (Step S41).

If it is determined that the data type 222*e* is a string type (Step S41; Yes), the mapping unit 33 determines whether the document item value includes the string that matches an arbitrary string that is defined in the mapping auxiliary information 23 (Step S42). Here, the arbitrary string means a candidate of the expected value that needs to be extracted from the document item value based on the XBRL element. This is to extract the expected value from the document item value based on the XBRL element. For example, it is such a case where, if the document item value is "representative director Taro Nihon", "representative director" is extracted based on the XBRL element "title" and "Taro Nihon" based on the XBRL element "name".

If it is determined that the document item value includes the string that matches an arbitrary string that is defined in the mapping auxiliary information 23 (Step S42; Yes), the mapping unit 33 extracts, from the document item value, the string that matches the arbitrary string (Step S43). Then, the mapping unit 33 proceeds to Step S51 to further perform the mapping operation.

Conversely, if it is determined that the document item value does not includes the string that is defined in the mapping auxiliary information 23 (Step S42; No), the mapping unit 33 further performs the next determination operation. Specifically, the mapping unit 33 determines whether the document item value includes an arbitrary delimiter character or space character that is defined in the mapping auxiliary information 23 (Step S44). This is to search for a character that is a delimiter in the document item value.

If it is determined that the document item value includes an arbitrary delimiter character or space character that is defined in the mapping auxiliary information 23 (Step S44; Yes), the mapping unit 33 divides the document item value at the delimiter character or space character and extracts the first string (Step S45). For example, if the document item value is "AAA BBB", the mapping unit 33 divides the document item value at the space character and extracts the string "AAA" before the space character. Then, the mapping unit 33 proceeds to Step S51 to further perform the mapping operation.

Conversely, if it is determined that the document item value does not include the delimiter character or space character that is defined in the mapping auxiliary information 23 (Step S44; No), the mapping unit 33 extracts the document item value (Step S46). Then, the mapping unit 33 proceeds to Step S51 to further perform the mapping operation.

At Step S41, if it is determined that the data type 222*e* is not a string type (Step S41; No), the mapping unit 33 extracts, from the document item value, the string that matches the data type (Step S47). Then, the mapping unit 33 proceeds to Step S51 to further perform the mapping operation.

At Step S51, the mapping unit 33 determines whether a string has been extracted from the document item value (Step S51). If it is determined that a string has been extracted from the document item value (Step S51; Yes), the mapping unit 33 assigns the extracted string to the descendant element being processed (Step S52). Then, the mapping unit 33 proceeds to Step S56.

Conversely, if it is determined that a string has not been extracted from the document item value (Step S51; No), the mapping unit 33 determines whether the descendant element being processed is an element for which a nil value is allowed (Step S53). It is determined whether it is an element for which a nil value is allowed by using the nil-value allowance flag 222*d* that is acquired from the element declaration.

If it is determined that it is an element for which a nil value is allowed (Step S53; Yes), the mapping unit 33 does not assign anything to the descendant element being processed but sets "true" to the nil attribute (Step S54). Then, the mapping unit 33 proceeds to Step S31 to process the next descendant element in the stack.

Conversely, if it is determined that it is not an element for which a nil value is allowed (Step S53; No), the mapping unit 33 notifies a mapping error to a requester of the document conversion as data has not been extracted from the document item value (Step S55). Then, the mapping unit 33 terminates the mapping operation.

At Step S56, the mapping unit 33 determines whether, with respect to the document item value, a string is present before the extracted string (Step S56). If it is determined that a string is present before the extracted string (Step S56; Yes), the mapping unit 33 deletes the string before the extracted string with respect to the document item value (Step S57). For example, an explanation is given of a case where the document item value is "the 100th stage (from the 22nd year of the Heisei era . . . " and the extracted string is "100". With respect to the document item value, the string before the extracted string is "the". Therefore, the mapping unit 33 sets the document item value to "stage (from the 22nd year of the Heisei era . . . " from which "the" and the extracted string "100" have been deleted. Then, the mapping unit 33 proceeds to Step S58.

Conversely, if it is determined that a string is not present before the extracted string (Step S56; No), the mapping unit 33 proceeds to Step S58. At Step S58, the mapping unit 33 updates the document item value (Step S58). Specifically, if a string is present before the extracted string, the document item value that is used for the next descendant element to be processed is updated so as to have the content from which the extracted string and the string before the extracted string have been deleted. Furthermore, if a string is not present before the extracted string, the document item value that is used for the next descendant element to be processed is updated so as to have the content from which the extracted string has been deleted. Then, the mapping unit 33 proceeds to Step S31 to process the next descendant element in the stack.

Advantage of the Embodiment

According to the above-described embodiment, the document conversion device 1 uses the presentation tree 221 that includes the hierarchical relationship among elements in the XBRL document 41 to detect, from the document items included in the financial report 21, the document item that corresponds to an element that has a descendant in the XBRL document 41. Then, the document conversion device 1 divides the value of the detected document item. Then, the document conversion device 1 maps the divided value to a child element of the element that corresponds to the detected document item and that is in the XBRL document 41. Furthermore, the document conversion device 1 uses the mapped value and the child element to convert the financial report 21 into the XBRL document 41. With this configuration, when the document conversion device 1 generates the XBRL document 41 from the financial report 21, it can correctly map a document item of the financial report 21 to an element of the presentation tree 221.

Furthermore, according to the above-described embodiment, the document conversion device 1 divides the document item value of a document item based on the data type of the element that has a descendant relationship with the element that is included in the presentation tree 221. With this configuration, the document conversion device 1 is capable of extracting, from a document item value, a string that conforms to the data type of an element if the data type of the element is, for example, a date type or an integer type. As a result, the document conversion device 1 is capable of correctly mapping the document item value of a document item in the financial report 21 to an element of the presentation tree 221.

Furthermore, according to the above-described embodiment, if the document item value of a document item includes a string that is unnecessary as a content to be related to an element, the document conversion device 1 deletes the unnecessary string from the document item value of the document item. With this configuration, the document conversion device 1 can improve the accuracy of the content to be mapped to an element.

Furthermore, according to the above-described embodiment, if the data type of the element that has a descendant relationship with an element that is included in the presentation tree 221 is a string type, and if the document item value of a document item includes a string that is identical with an arbitrary string that is previously defined, the document conversion device 1 extracts the identical string from the document item value. Then, the document conversion device 1 determines that the extracted string is a divided content. With this configuration, if the data type of an element is a string type, the document conversion device 1 is capable of extracting an expected string from the document item value. That is, the document conversion device 1 can further improve the accuracy of the content to be mapped to an element.

Furthermore, according to the above-described embodiment, the document conversion device 1 performs the following operation if the document item value of a document item does not include a string that is identical with an arbitrary string that is previously defined, and if the document item value of the document item includes a delimiter character or a space character. Specifically, the document conversion device 1 determines that the string from the beginning of the document item value of a document item to before a delimiter character or a space character is a divided content. With this configuration, if the data type of an element is a string type, the document conversion device 1 is capable of dividing a string by using a delimiter character or a space character; therefore, the document item value can be correctly mapped to an element that has a descendant relationship.

[Program, and the Like]

Furthermore, according to the embodiment, an explanation is given of a case where, with regard to the financial report 21, the document conversion device 1 maps the value of a document item included in the financial report 21 to an XBRL element. However, there may be a case where the document conversion device 1 maps, to an XBRL element, the value of a document item that is included in not only the financial report 21 but also reports that are related to general financial accounting statements and that are text documents. Thus, the document conversion device 1 is capable of converting a text document (including a word processing document) into an XBRL document for general purposes.

Furthermore, the document conversion device 1 can be implemented by installing the functions of the above-described control unit 3, the storage unit 2, or the like, in an information processing apparatus, such as a known personal computer or workstation.

Furthermore, each component of the document conversion device 1 illustrated does not always need to be physically configured as illustrated in the drawings. Specifically, specific forms of separation and combination of the document conversion device 1 are not limited to those depicted in the drawings, and a configuration may be such that all or some of them are functionally or physically separated or combined in an arbitrary unit depending on various types of loads, usage, or the like. For example, the layout analyzing unit 31 and the definition-field analyzing unit 32 may be combined as a single unit. Furthermore, the mapping unit 33 may be separated into a detecting unit that detects, from the financial report 21, a document item for which the document item value is divided and into a mapping unit that divides the document item value of the detected document item and maps each value of the divided document item value to each XBRL element. Moreover, the storage unit 2 of the financial report 21, the XBRL-element definition field 22, or the like, may be connected as an external device of the document conversion device 1 via a network.

Furthermore, the various operations that have been described in the above embodiment may be performed if prepared programs are performed by a computer, such as a personal computer or workstation. In the following, an explanation is given of an example of a computer that performs a document conversion program that implements the same functionality as the document conversion device 1 illustrated in FIG. 1. FIG. 11 is a diagram that illustrates an example of a computer that executes the document conversion program.

As illustrated in FIG. 11, a computer 200 includes a CPU 203 that performs various calculation operations; an input device 215 that receives an input of data from a user; and a display control unit 207 that controls a display device 209. Furthermore, the computer 200 includes a drive device 213 that reads a program, or the like, from a storage medium; and a communication control unit 217 that performs a transaction of data with a different computer via a network. Moreover, the computer 200 includes a memory 201 that temporarily stores various types of information; and an HDD 205. Furthermore, the memory 201, the CPU 203, the HDD 205, the display control unit 207, the drive device 213, the input device 215, and the communication control unit 217 are connected to one another via a bus 219.

The drive device 213 is a device for, for example, a removable disk 211. The HDD 205 stores a document conversion program 205*a* and a document-conversion related information 205*b*.

The CPU 203 reads the document conversion program 205*a* and loads it into the memory 201. The document conversion program 205*a* functions as a document conversion process 201*a*.

For example, the document conversion process 201*a* corresponds to each functional unit of the control unit 3. The document-conversion related information 205*b* corresponds to the financial report 21, the XBRL-element definition field 22, and the mapping auxiliary information 23.

The document conversion program 205*a* does not always need to be initially stored in the HDD 205. For example, the program is stored in a "portable physical medium", such as a flexible disk (FD), CD-ROM, DVD disk, magnet-optical disk, or IC card, which is inserted into the computer 200. The computer 200 may read the document conversion program 205*a* from them and execute it.

According to one aspect, when an XBRL document is generated from the financial information on a text document, it is possible to correctly map a document item of the text document to an element of the hierarchical document.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a document conversion program converting a first document into a second document that causes a computer to execute a process comprising:
   detecting a first document item in the first document that corresponds to a second document item in the second document that has a child document item in the second document based on a hierarchical document that includes a hierarchical relationship information among document items in the second document, and dividing a content of the first document item in accordance with a data type, restriction information, and nil-value allowance information of the child document item of the second document item that corresponds to the first document item and that is in the second document;
   relating the divided content of the first document item to the child document item; and
   converting the first document into the second document by using the related divided content and the child document item, wherein
   the dividing includes dividing the content of the first document item in accordance with a data type of a child document item of a document item that corresponds to the first document item and that is in the second document, wherein
   the dividing includes, if it is determined that the data type is a string type, determining whether a document item value includes a string that matches an arbitrary string that is defined in the auxiliary information, and, if it is determined that the data type is not the string type, extracting, from the document item value, a string that matches the data type, and
   the arbitrary string means a candidate of an expected value that needs to be extracted from the document item value on the basis of an eXtensible Business Reporting Language (XBRL) element.

2. The non-transitory computer-readable recording medium according to claim 1, wherein the dividing includes, when a content of the first document item includes a string that is unnecessary as a content to be related to a child document item, deleting the unnecessary string from the content of the first document item.

3. The non-transitory computer-readable recording medium according to claim 1, wherein the dividing includes, when a data type of a child document item of a document item that corresponds to the first document item and that is in the second document is a string type and, when a content of the first document item includes a string that is identical with a specific string that is previously defined and that corresponds to a child document item, extracting the identical string from the content of the first document item and determining that the extracted string is a divided content.

4. The non-transitory computer-readable recording medium according to claim 3, wherein the dividing includes, when a content of the first document item does not include a string that is identical with a specific string that is previously defined and that corresponds to a child document item and, when the content of the first document item include a delimiter character or a space character, determining that a string from a beginning of the content of the first document item to before the delimiter character or the space character is a divided content.

5. A document conversion device comprising:
   a processor that executes a process converting a first document into a second document, the process including:
   detecting a first document item in the first document that corresponds to a second document item in the second document that has a child document item in the second document based on a hierarchical document that includes a hierarchical relationship information among document items in the second document, and dividing a content of the first document item in accordance with a data type, restriction information, and nil-value allowance information of the child document item of the second document item that corresponds to the first document item and that is in the second document;
   relating the divided content of the first document item to the child document item; and
   converting the first document into the second document by using the related divided content and the child document item, wherein
   the dividing includes dividing the content of the first document item in accordance with a data type of a child document item of a document item that corresponds to the first document item and that is in the second document, wherein
   the dividing includes, if it is determined that the data type is a string type, determining whether a document item value includes a string that matches an arbitrary string that is defined in the auxiliary information, and, if it is determined that the data type is not the string type, extracting, from the document item value, a string that matches the data type, and
   the arbitrary string means a candidate of an expected value that needs to be extracted from the document item value on the basis of an eXtensible Business Reporting Language (XBRL) element.

6. A document conversion method converting a first document into a second document, the document conversion method comprising:
   detecting a first document item in the first document that corresponds to a second document item in the second document that has a child document item in the second document based on a hierarchical document that includes a hierarchical relationship information among document items in the second document, and dividing a content of the first document item in accordance with a data type, restriction information, and nil-value allowance information of the child document item of the second document item that corresponds to the first document item and that is in the second document, by a processor;
   relating the divided content of the first document item to the child document item by the processor; and converting the first document into the second document by using the related divided content and the child document item by the processor, wherein the dividing includes dividing the content of the first document item in accordance with a data type of a child document item of a document item that corresponds to the first document item and that is in the second document, wherein the dividing includes, if it is determined that the data type is a string type, determining whether a document item value includes a string that matches an arbitrary string that is defined in the auxiliary information, and, if it is determined that the data type is not the string type, extracting, from the document item value, a string that matches the data type, and the arbitrary string means a candidate of an expected value that needs to be extracted from the document item value on the basis of an eXtensible Business Reporting Language (XBRL) element.

\* \* \* \* \*